United States Patent
He et al.

(10) Patent No.: US 11,829,039 B1
(45) Date of Patent: Nov. 28, 2023

(54) OPTICAL SYSTEMS WITH GREEN-HEAVY ILLUMINATION SEQUENCES FOR FLCOS DISPLAY PANELS

(71) Applicant: Apple Inc., Cupertino, CA (US)

(72) Inventors: Ziqian He, Oviedo, FL (US); Xiaokai Li, Mountain View, CA (US); Yuan Chen, Campbell, CA (US); Zhibing Ge, Los Altos, CA (US); Aaron L. Holsteen, Aurora, CO (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/412,107

(22) Filed: Aug. 25, 2021

Related U.S. Application Data

(60) Provisional application No. 63/072,000, filed on Aug. 28, 2020.

(51) Int. Cl.
| | |
|---|---|
| G02B 27/28 | (2006.01) |
| G02B 27/01 | (2006.01) |
| G02F 1/135 | (2006.01) |
| G02B 6/10 | (2006.01) |
| G02F 1/13357 | (2006.01) |
| G02F 1/1335 | (2006.01) |
| G02F 1/133 | (2006.01) |
| G09G 3/34 | (2006.01) |
| G09G 3/36 | (2006.01) |

(52) U.S. Cl.
CPC .............. *G02F 1/135* (2013.01); *G02B 6/10* (2013.01); *G02B 27/0172* (2013.01); *G02F 1/13312* (2021.01); *G02F 1/133615* (2013.01); *G02F 1/133622* (2021.01); *G09G 3/3413* (2013.01); *G09G 3/36* (2013.01); *G02B 2027/0112* (2013.01); *G02F 2202/10* (2013.01); *G09G 2320/0242* (2013.01); *G09G 2330/021* (2013.01); *G09G 2360/144* (2013.01)

(58) Field of Classification Search
CPC ............................................... G02B 2027/0178
See application file for complete search history.

(56) References Cited

U.S. PATENT DOCUMENTS

| | | |
|---|---|---|
| 8,708,499 B2 | 4/2014 | Katou |
| 8,964,298 B2 | 2/2015 | Haddick et al. |
| 10,007,118 B2 | 6/2018 | Border |
| (Continued) | | |

*Primary Examiner* — Nan-Ying Yang
(74) *Attorney, Agent, or Firm* — Treyz Law Group, P.C.; Michael H. Lyons

(57) ABSTRACT

A display may include illumination optics, a ferroelectric liquid crystal on silicon (fLCOS) panel, and a waveguide. The illumination optics may include a red, green, and blue light sources. The fLCOS panel may produce image light by modulating a series of image frames onto illumination light. Control circuitry may control the illumination optics to produce the illumination light for each image frame in the series of image frames according to a green-heavy illumination sequence that includes first, second, and third time periods. The green light source may be active during each of the first, second, and third time periods. This may allow the green light source to be driven with a lower current density than the other light sources without significantly reducing image quality at an eye box. The lower current density may match the peak efficiency of the green light source, thereby minimizing power consumption by the display.

18 Claims, 8 Drawing Sheets

(56) References Cited

U.S. PATENT DOCUMENTS

| | | | |
|---|---|---|---|
| 2009/0261737 A1* | 10/2009 | Wright | F21V 23/0492 |
| | | | 315/297 |
| 2010/0165013 A1* | 7/2010 | Yamamoto | G09G 3/3607 |
| | | | 345/691 |
| 2012/0002256 A1* | 1/2012 | Lacoste | G03H 1/22 |
| | | | 359/489.08 |
| 2017/0263190 A1* | 9/2017 | Yashiki | G09G 3/3607 |
| 2019/0385543 A1* | 12/2019 | Yang | G09G 3/3611 |

* cited by examiner

OPTICAL SYSTEMS WITH GREEN-HEAVY ILLUMINATION SEQUENCES FOR FLCOS DISPLAY PANELS

This application claims the benefit of U.S. Provisional Patent Application No. 63/072,000, filed Aug. 28, 2020, which is hereby incorporated by reference herein in its entirety.

BACKGROUND

This relates generally to optical systems and, more particularly, to optical systems for displays.

Electronic devices may include displays that present images to a user's eyes. For example, devices such as virtual reality and augmented reality headsets may include displays with optical elements that allow users to view the displays.

It can be challenging to design devices such as these. If care is not taken, the components used in displaying content may be unsightly and bulky, can consume excessive power, and may not exhibit desired levels of optical performance.

SUMMARY

An electronic device such as a head-mounted device may have one or more near-eye displays that produce images for a user. The head-mounted device may be a pair of virtual reality glasses or may be an augmented reality headset that allows a viewer to view both computer-generated images and real-world objects in the viewer's surrounding environment.

The display may include a display module and a waveguide. The display module may include a spatial light modulator such as a ferroelectric liquid crystal on silicon (fLCOS) display panel and illumination optics. The illumination optics may include light sources such as light emitting diodes (LEDs) that produce illumination light. The illumination light may be provided with a linear polarization and may be transmitted to the fLCOS display panel. The fLCOS display panel may modulate image data (e.g., image frames) onto the illumination light to produce image light. The waveguide may direct the image light towards an eye box.

The illumination optics may include a red light source, a green light source, and a blue light source. The fLCOS display panel may produce the image light by modulating a series of image frames onto illumination light. Control circuitry in the device may control the illumination optics to produce the illumination light for each image frame in the series of image frames according to a green-heavy illumination sequence that includes first, second, and third sequential time periods. The green light source may be active during each of the first, second, and third time periods. For example, the control circuitry may activate the red and green light sources during the first time period. The control circuitry may activate the green light source during the second time period. The control circuitry may activate the blue and green light sources during the third time period. This may allow the green light source to be driven with a lower current density than when other illumination sequences are used without significantly reducing image quality at the eye box. The lower current density may match the peak efficiency of the green light source, thereby minimizing power consumption by the display. If desired, the control circuitry may pre-compensate the image frames for chromatic aberrations.

DETAILED DESCRIPTION

Figure 1:
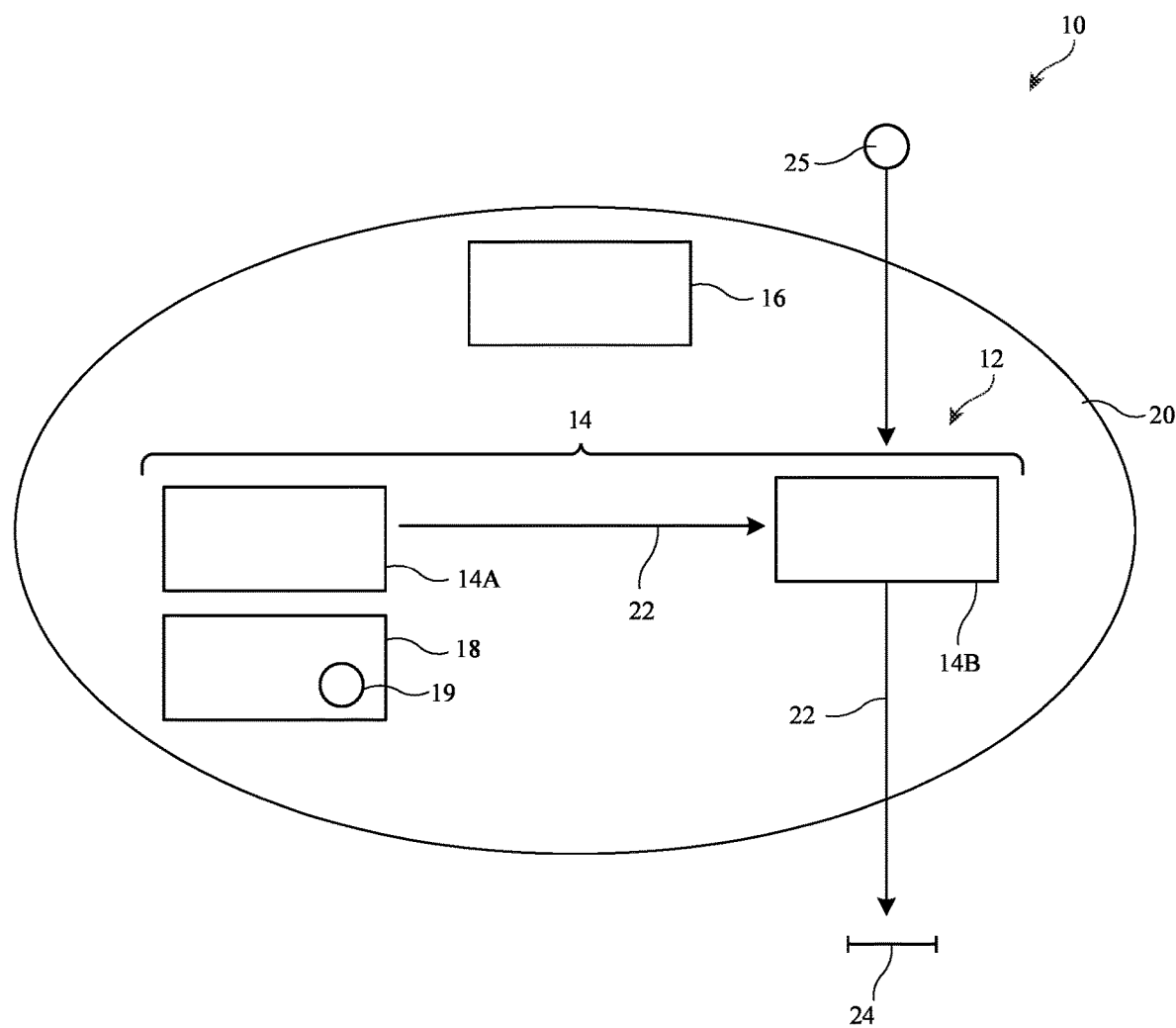
FIG. 1 is a diagram of an illustrative system having a display in accordance with some embodiments.

An illustrative system having a device with one or more near-eye display systems is shown in FIG. 1. System 10 may be a head-mounted device having one or more displays such as near-eye displays 14 mounted within support structure (housing) 20. Support structure 20 may have the shape of a pair of eyeglasses (e.g., supporting frames), may form a housing having a helmet shape, or may have other configurations to help in mounting and securing the components of near-eye displays 14 on the head or near the eye of a user. Near-eye displays 14 may include one or more display modules such as display modules 14A and one or more optical systems such as optical systems 14B. Display modules 14A may be mounted in a support structure such as support structure 20. Each display module 14A may emit light 22 (sometimes referred to herein as image light 22) that is redirected towards a user's eyes at eye box 24 using an associated one of optical systems 14B.

The operation of system 10 may be controlled using control circuitry 16. Control circuitry 16 may include storage and processing circuitry for controlling the operation of system 10. Circuitry 16 may include storage such as hard disk drive storage, nonvolatile memory (e.g., electrically-programmable-read-only memory configured to form a solid state drive), volatile memory (e.g., static or dynamic random-access-memory), etc. Processing circuitry in control circuitry 16 may be based on one or more microprocessors, microcontrollers, digital signal processors, baseband processors, power management units, audio chips, graphics processing units, application specific integrated circuits, and other integrated circuits. Software code (instructions) may be stored on storage in circuitry 16 and run on processing circuitry in circuitry 16 to implement operations for system 10 (e.g., data gathering operations, operations involving the adjustment of components using control signals, image rendering operations to produce image content to be displayed for a user, etc.).

System 10 may include input-output circuitry such as input-output devices 12. Input-output devices 12 may be used to allow data to be received by system 10 from external equipment (e.g., a tethered computer, a portable device such as a handheld device or laptop computer, or other electrical equipment) and to allow a user to provide head-mounted device 10 with user input. Input-output devices 12 may also be used to gather information on the environment in which system 10 (e.g., head-mounted device 10) is operating. Output components in devices 12 may allow system 10 to provide a user with output and may be used to communicate with external electrical equipment. Input-output devices 12 may include sensors and other components 18 (e.g., image sensors for gathering images of real-world object that are digitally merged with virtual objects on a display in system 10, accelerometers, depth sensors, light sensors, haptic output devices, speakers, batteries, wireless communications circuits for communicating between system 10 and external electronic equipment, etc.). In one suitable arrangement that is sometimes described herein as an example, the sensors in components 18 may include one or more temperature (T) sensors 19. Temperature sensor(s) 19 may gather temperature sensor data (e.g., temperature values) from one or more locations in system 10. If desired, control circuitry 16 may use the gathered temperature sensor data in controlling the operation of display module 14A.

Display modules 14A (sometimes referred to herein as display engines 14A, light engines 14A, or projectors 14A) may include reflective displays (e.g., displays with a light source that produces illumination light that reflects off of a reflective display panel to produce image light such as liquid crystal on silicon (LCOS) displays (e.g., ferroelectric liquid crystal on silicon (fLCOS) displays), digital-micromirror device (DMD) displays, or other spatial light modulators), emissive displays (e.g., micro-light-emitting diode (uLED) displays, organic light-emitting diode (OLED) displays, laser-based displays, etc.), or displays of other types. An arrangement in which display module 14A includes an fLCOS display is sometimes described herein as an example. Light sources in display modules 14A may include uLEDs, OLEDs, LEDs, lasers, combinations of these, or any other desired light-emitting components.

Optical systems 14B may form lenses that allow a viewer (see, e.g., a viewer's eyes at eye box 24) to view images on display(s) 14. There may be two optical systems 14B (e.g., for forming left and right lenses) associated with respective left and right eyes of the user. A single display 14 may produce images for both eyes or a pair of displays 14 may be used to display images. In configurations with multiple displays (e.g., left and right eye displays), the focal length and positions of the lenses formed by components in optical system 14B may be selected so that any gap present between the displays will not be visible to a user (e.g., so that the images of the left and right displays overlap or merge seamlessly).

If desired, optical system 14B may contain components (e.g., an optical combiner, etc.) to allow real-world image light from real-world images or objects 25 to be combined optically with virtual (computer-generated) images such as virtual images in image light 22. In this type of system, which is sometimes referred to as an augmented reality system, a user of system 10 may view both real-world content and computer-generated content that is overlaid on top of the real-world content. Camera-based augmented reality systems may also be used in device 10 (e.g., in an arrangement in which a camera captures real-world images of object 25 and this content is digitally merged with virtual content at optical system 14B).

System 10 may, if desired, include wireless circuitry and/or other circuitry to support communications with a computer or other external equipment (e.g., a computer that supplies display 14 with image content). During operation, control circuitry 16 may supply image content to display 14. The content may be remotely received (e.g., from a computer or other content source coupled to system 10) and/or may be generated by control circuitry 16 (e.g., text, other computer-generated content, etc.). The content that is supplied to display 14 by control circuitry 16 may be viewed by a viewer at eye box 24.

Figure 2:
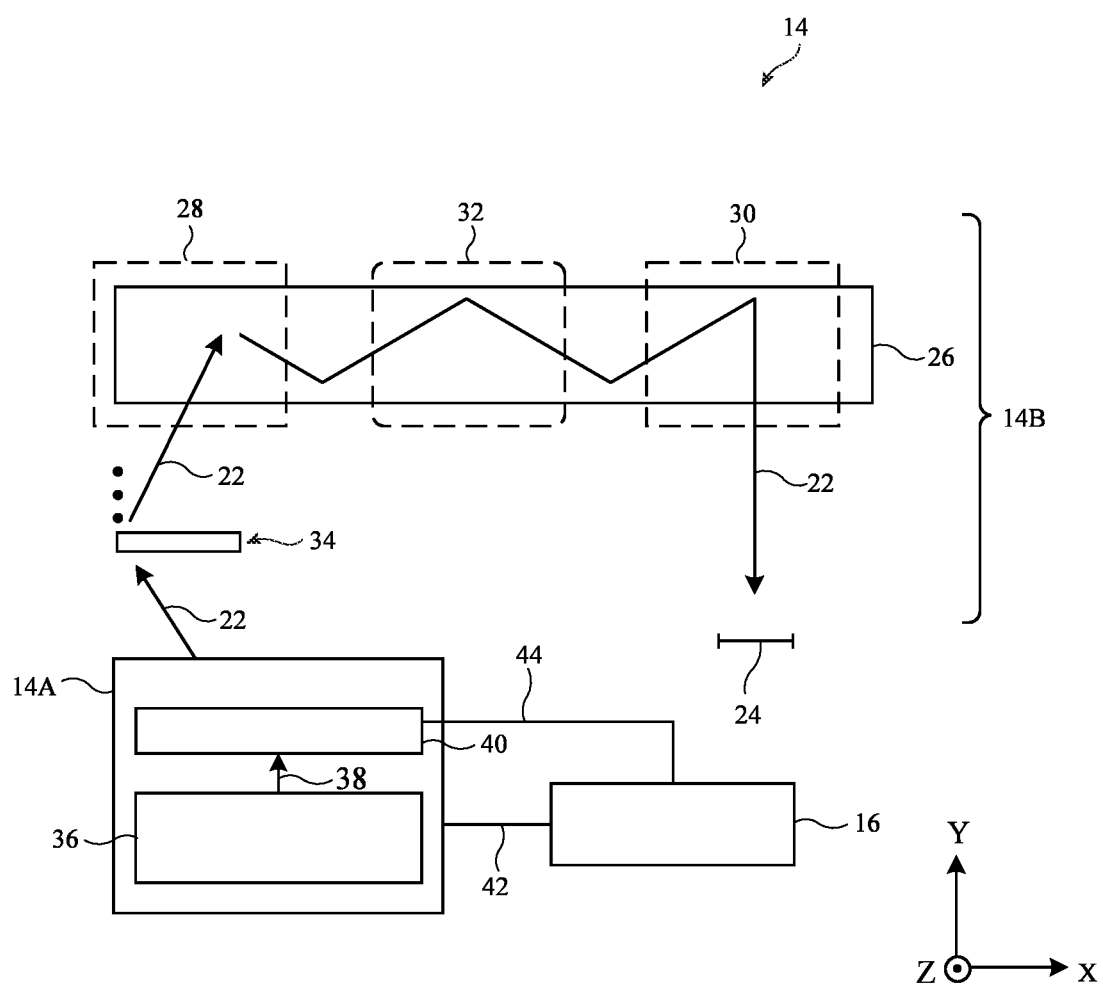
FIG. 2 is a top view of an illustrative optical system for a display having a display module that provides image light to a waveguide in accordance with some embodiments.

FIG. 2 is a top view of an illustrative display 14 that may be used in system 10 of FIG. 1. As shown in FIG. 2, display 14 may include one or more display modules such as display module 14A and an optical system such as optical system 14B. Optical system 14B may include optical elements such as one or more waveguides 26. Waveguide 26 may include one or more stacked substrates (e.g., stacked planar and/or curved layers sometimes referred to herein as waveguide substrates) of optically transparent material such as plastic, polymer, glass, etc.

If desired, waveguide 26 may also include one or more layers of holographic recording media (sometimes referred to herein as holographic media, grating media, or diffraction grating media) on which one or more diffractive gratings are recorded (e.g., holographic phase gratings, sometimes referred to herein as holograms). A holographic recording may be stored as an optical interference pattern (e.g., alternating regions of different indices of refraction) within a photosensitive optical material such as the holographic media. The optical interference pattern may create a holographic phase grating that, when illuminated with a given light source, diffracts light to create a three-dimensional reconstruction of the holographic recording. The holographic phase grating may be a non-switchable diffractive grating that is encoded with a permanent interference pattern or may be a switchable diffractive grating in which the diffracted light can be modulated by controlling an electric field applied to the holographic recording medium. Multiple holographic phase gratings (holograms) may be recorded within (e.g., superimposed within) the same volume of holographic medium if desired. The holographic phase gratings may be, for example, volume holograms or thin-film holograms in the grating medium. The grating media may include photopolymers, gelatin such as dichromated gelatin, silver halides, holographic polymer dispersed liquid crystal, or other suitable holographic media.

Diffractive gratings on waveguide 26 may include holographic phase gratings such as volume holograms or thin-film holograms, meta-gratings, or any other desired diffractive grating structures. The diffractive gratings on waveguide 26 may also include surface relief gratings formed on one or more surfaces of the substrates in waveguides 26, gratings formed from patterns of metal structures, etc. The diffractive gratings may, for example, include multiple multiplexed gratings (e.g., holograms) that at least partially overlap within the same volume of grating medium (e.g., for diffracting different colors of light and/or light from a range of different input angles at one or more corresponding output angles).

Optical system 14B may include collimating optics such as collimating lens 34. Collimating lens 34 may include one or more lens elements that help direct image light 22 towards waveguide 26. Collimating lens 34 is shown external to display module 14A in FIG. 2 for the sake of clarity. In general, collimating lens 34 may be formed entirely external to display module 14A, entirely within display module 14A, or one or more lens elements in collimating lens 34 may be formed in display module 14A (e.g., collimating lens 34 may include both lens elements that are internal to display module 14A and lens elements that are external to display module 14A). Collimating lens 34 may be omitted if desired. If desired, display module(s) 14A may be mounted within support structure 20 of FIG. 1 while optical system 14B may be mounted between portions of support structure 20 (e.g., to form a lens that aligns with eye box 24). Other mounting arrangements may be used, if desired.

As shown in FIG. 2, control circuitry 16 may control display module 14A to generate image light 22 associated with image content (data) to be displayed to (at) eye box 24. In the example of FIG. 2, display module 14A includes illumination optics 36 and a spatial light modulator such as fLCOS display panel 40 (sometimes referred to herein simply as fLCOS panel 40).

Control circuitry 16 may be coupled to illumination optics 36 over control path(s) 42. Control circuitry 16 may be coupled to fLCOS panel 40 over control path(s) 44. Control circuitry 16 may provide control signals to illumination optics 36 over control path(s) 42 that control illumination optics 36 to produce illumination light 38 (sometimes referred to herein as illumination 38). The control signals may, for example, control illumination optics 36 to produce illumination light 38 using a corresponding illumination sequence. The illumination sequence may involve sequentially illuminating light sources of different colors in illumination optics 36. In one suitable arrangement that is sometimes described herein as an example, the illumination sequence may be a green-heavy illumination sequence.

Illumination optics 36 may illuminate fLCOS display panel 40 using illumination light 38. Control circuitry 16 may provide control signals to fLCOS display panel 40 over control path(s) 44 that control fLCOS display panel 40 to modulate illumination light 38 to produce image light 22. For example, control circuitry 16 may provide image data such as image frames to fLCOS display panel 40. The image light 22 produced by fLCOS display panel 40 may include the image frames identified by the image data. Control circuitry 16 may, for example, control fLCOS display panel 40 to provide fLCOS drive voltage waveforms to electrodes in the display panel. The fLCOS drive voltage waveforms may be overdriven or underdriven to optimize the performance of display module 14A, if desired. While an arrangement in which display module 14A includes fLCOS display panel 40 is described herein as an example, in general, display module 14A may include any other desired type of reflective display panel (e.g., a DMD panel), an emissive display panel, etc.

Image light 22 may be collimated using collimating lens 34 (sometimes referred to herein as collimating optics 34). Optical system 14B may be used to present image light 22 output from display module 14A to eye box 24. Optical system 14B may include one or more optical couplers such as input coupler 28, cross-coupler 32, and output coupler 30. In the example of FIG. 2, input coupler 28, cross-coupler 32, and output coupler 30 are formed at or on waveguide 26. Input coupler 28, cross-coupler 32, and/or output coupler 30 may be completely embedded within the substrate layers of waveguide 26, may be partially embedded within the substrate layers of waveguide 26, may be mounted to waveguide 26 (e.g., mounted to an exterior surface of waveguide 26), etc.

The example of FIG. 2 is merely illustrative. One or more of these couplers (e.g., cross-coupler 32) may be omitted. Optical system 14B may include multiple waveguides that are laterally and/or vertically stacked with respect to each other. Each waveguide may include one, two, all, or none of couplers 28, 32, and 30. Waveguide 26 may be at least partially curved or bent if desired.

Waveguide 26 may guide image light 22 down its length via total internal reflection. Input coupler 28 may be configured to couple image light 22 from display module(s) 14A into waveguide 26 (e.g., at an angle such that the image light can propagate down waveguide 26 via total internal reflection), whereas output coupler 30 may be configured to couple image light 22 from within waveguide 26 to the exterior of waveguide 26 and towards eye box 24. Input coupler 28 may include a reflective or transmissive input coupling prism if desired. As an example, display module(s) 14A may emit image light 22 in the +Y direction towards optical system 14B.

When image light 22 strikes input coupler 28, input coupler 28 may redirect image light 22 so that the light propagates within waveguide 26 via total internal reflection towards output coupler 30 (e.g., in the +X direction). When image light 22 strikes output coupler 30, output coupler 30 may redirect image light 22 out of waveguide 26 towards eye box 24 (e.g., back in the −Y direction). In scenarios where cross-coupler 32 is formed at waveguide 26, cross-coupler 32 may redirect image light 22 in one or more directions as it propagates down the length of waveguide 26, for example. In this way, display module 14A may provide image light 22 to eye box 24 over an optical path that extends from display module 14A, through collimating lens 34, input coupler 28, cross coupler 32, and output coupler 30.

Input coupler 28, cross-coupler 32, and/or output coupler 30 may be based on reflective and refractive optics or may be based on holographic (e.g., diffractive) optics. In arrangements where couplers 28, 30, and 32 are formed from reflective and refractive optics, couplers 28, 30, and 32 may include one or more reflectors (e.g., an array of micromirrors, partial mirrors, louvered mirrors, or other reflectors). In arrangements where couplers 28, 30, and 32 are based on holographic optics, couplers 28, 30, and 32 may include diffractive gratings (e.g., volume holograms, surface relief gratings, etc.).

Figure 3:
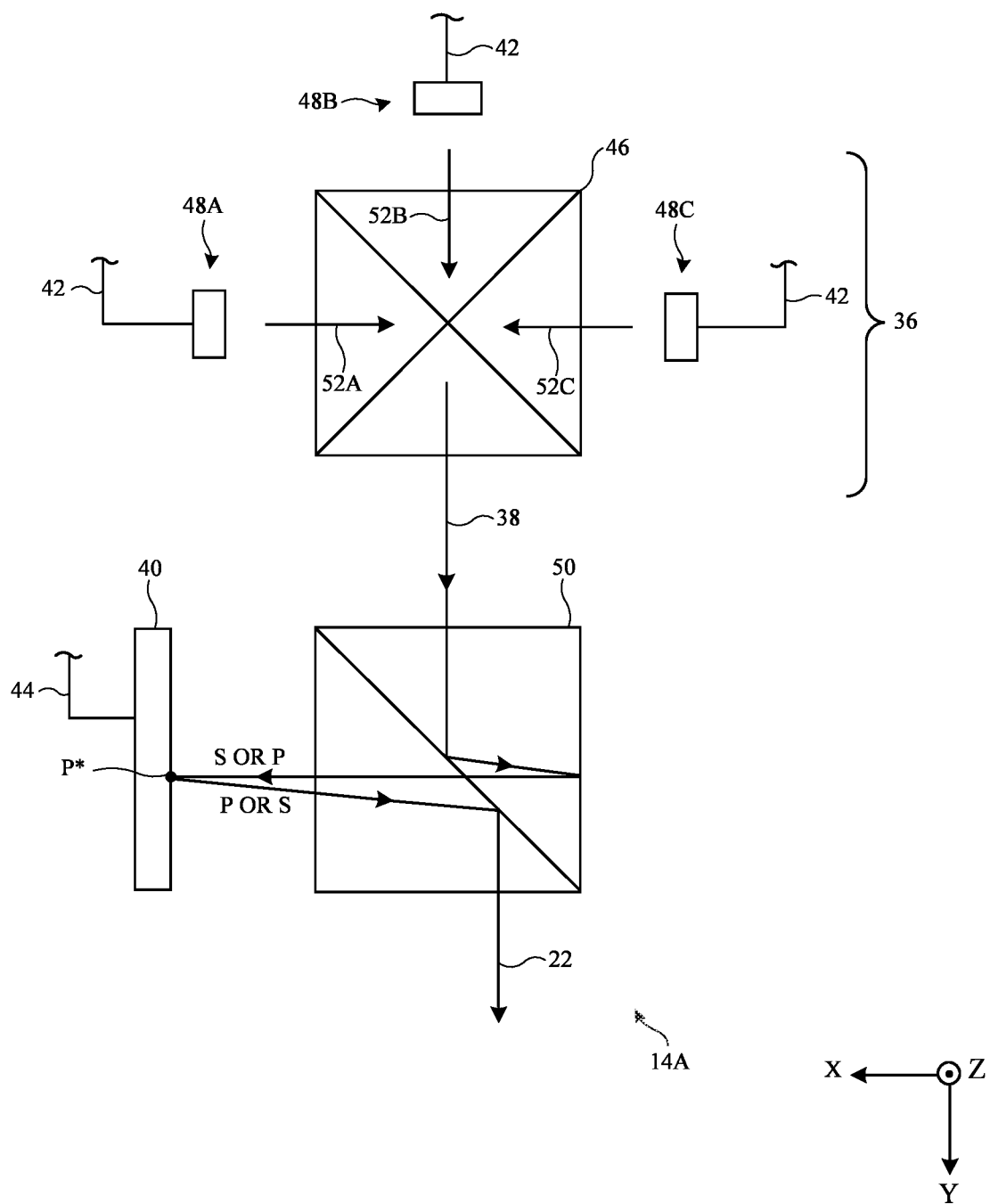
FIG. 3 is a top view of an illustrative display module having a ferroelectric liquid crystal on silicon (fLCOS) display panel in accordance with some embodiments.

FIG. 3 is a top view of display module 14A. As shown in FIG. 3, display module 14A may include illumination optics 36 that provide illumination light 38 to fLCOS display panel 40. fLCOS display panel 40 may modulate images onto illumination light 38 to produce image light 22.

Illumination optics 36 may include one or more light sources 48 such as a first light source 48A, a second light source 48B, and a third light source 48C. Light sources 48 may emit illumination light 52. Prism 46 (e.g., an X-plate) in illumination optics 36 may combine the illumination light 52 emitted by each of the light sources 48 to produce the illumination light 38 that is provided to fLCOS display panel 40. In one suitable arrangement that is sometimes described herein as an example, first light source 48A emits red illumination light 52A (e.g., light source 48A may be a red (R) light source), second light source 48B emits green illumination light 52B (e.g., light source 48B may be a green (G) light source), and third light source 48C emits blue illumination light 52C (e.g., light source 48C may be a blue (B) light source). This is merely illustrative. In general, light sources 48A, 48B, and 48C may respectively emit light in any desired wavelength bands (e.g., visible wavelengths, infrared wavelengths, near-infrared wavelengths, etc.).

An arrangement in which illumination optics 36 includes only one light source 48A, one light source 48B, and one light source 48C is sometimes described herein as an example. This is merely illustrative. If desired, illumination optics 36 may include any desired number of light sources 48A (e.g., an array of light sources 48A), any desired number of light sources 48B (e.g., an array of light sources 48B), and any desired number of light sources 48C (e.g., an array of light sources 48C). Light sources 48A, 48B, and 48C may include LEDs, OLEDs, uLEDs, lasers, or any other desired light sources. An arrangement in which light sources 48A, 48B, and 48C are LED light sources is described herein as an example. Light sources 48A, 48B, and 48C may be controlled (e.g., separately/independently controlled) by control signals received from control circuitry 16 (FIG. 2) over control path(s) 42. The control signals may, for example, control light sources 48A, 48B, and 48C to emit illumination light 52 using a corresponding illumination sequence in which one or more of the light sources emits illumination light at any given time and the active light sources cycle over time.

Illumination light 38 may include the illumination light 52A, 52B, and 52C emitted by light sources 48A, 48B, and 48C, respectively. Prism 50 may provide illumination light 38 to fLCOS display panel 40. If desired, additional optical components such as lens elements, microlenses, polarizers, prisms, beam splitters, and/or diffusers (not shown in FIG. 3 for the sake of clarity) may be optically interposed between light sources 48A-C and fLCOS display panel 40 to help direct illumination light 38 from illumination optics 36 to fLCOS display panel 40.

Prism 50 may direct illumination light 38 onto fLCOS display panel 40 (e.g., onto different pixels P* on fLCOS display panel 40). Control circuitry 16 may provide control signals to fLCOS display panel 40 over control path(s) 44 that control fLCOS display panel 40 to selectively reflect illumination light 38 at each pixel location to produce image light 22 (e.g., image light having an image as modulated onto the illumination light by fLCOS display panel 40). As an example, the control signals may drive fLCOS drive voltage waveforms onto the pixels of fLCOS display panel 40. Prism 50 may direct image light 22 towards collimating lens 34 of FIG. 2.

In general, fLCOS display panel 40 operates on illumination light of a single linear polarization. Polarizing structures interposed on the optical path between light sources 48A-C and fLCOS display panel 40 may convert unpolarized illumination light into linearly polarized illumination light (e.g., s-polarized light or p-polarized illumination light). The polarizing structures may, for example, be optically interposed between prism 50 and fLCOS display panel 40, between prism 46 and prism 50, between light sources 48A-C and prism 46, within light sources 48A-C, or elsewhere.

If a given pixel P* in fLCOS display panel 40 is turned on, the corresponding illumination light may be converted between linear polarizations by that pixel of the display panel. For example, if s-polarized illumination light 38 is incident upon a given pixel P*, fLCOS display panel 40 may reflect the s-polarized illumination light 38 to produce corresponding image light 22 that is p-polarized when pixel P* is turned on. Similarly, if p-polarized illumination light 38 is incident upon pixel P*, fLCOS display panel 40 may reflect the s-polarized illumination light 38 to produce corresponding image light 22 that is s-polarized when pixel P* is turned on. If pixel P* is turned off, the pixel does not convert the polarization of the illumination light, which prevents the illumination light from reflecting out of fLCOS display panel 40 as image light 22.

In general, the efficiency of the LEDs in light sources 48 may depend on the current density used to drive the LEDs. In addition, different color LEDs exhibit peak LED efficiency at different current densities. In practice, green LEDs such as an LED in light source 48B may reach peak LED efficiency at a lower current density than red LEDs (e.g., in light source 48A) and/or blue LEDs (e.g., in light source 48C). In order to reduce the overall power consumption of display module 14A, light source 48B may therefore be driven with a lower current density than light sources 48A and/or 48C.

The light sources 48A-C in illumination optics 36 may be driven using a corresponding illumination sequence. The illumination sequence may specify the order in which each light source 48 is activated to produce illumination light 38. In some scenarios, the illumination scheme is an RGBRGB illumination scheme. However, if care is not taken, driving light sources 48 using an RGBRGB illumination scheme while reducing the current density used to drive light source 48B may cause illumination light 38 to exhibit less overall brightness at green wavelengths. This may lead to an unsightly color and brightness imbalance in the images produced at eye box 24 (FIG. 2). In order to mitigate these issues while driving light source 48B with a reduced current density, light sources 48A-C may be driven using a green-heavy illumination sequence.

Figure 4:
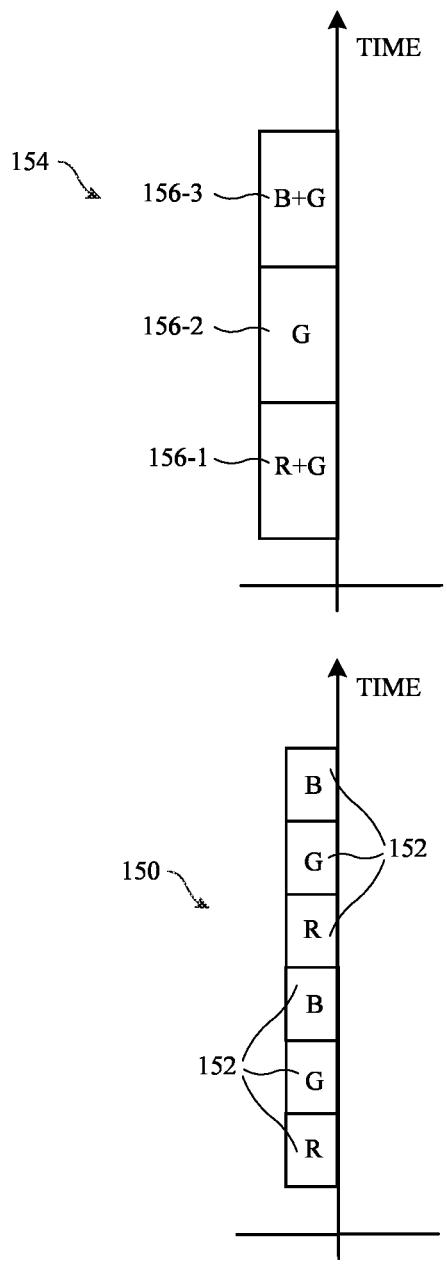
FIG. 4 is a timing diagram of illustrative illumination sequences that may be used by light sources to optimize power consumption in a display module in accordance with some embodiments.

FIG. 4 is a timing diagram of illustrative illumination sequences that may be used to drive light sources 48A-C. As shown in FIG. 4, an RGBRGB illumination sequence 150 may be used to drive light sources 48A-C in some scenarios. RGBRGB illumination sequence 150 may involve the sequential activation of only one of light sources 48A-C at any given time.

Under RGBRGB illumination sequence 150, for a given image frame, red light source 48A may be active for a first time period (slot) 152, during which red light source 48A emits red (R) illumination light 52A of FIG. 3. Green light source 48B and blue light source 48C may be inactive during the first time period 152 (e.g., green light source 48B and blue light source 48C may not emit any illumination light during the first time period 152). Green light source 48B may be active for a subsequent second time period 152, during which green light source 48B emits green (G) illumination light 52B. Red light source 48A and blue light source 48C may be inactive during the second time period 152 (e.g., red light source 48A and blue light source 48C may not emit any illumination light during the second time period 152). Blue light source 48C may be active during a subsequent third time period 152, during which blue light source 48C emits blue (B) illumination light 52C. Red light source 48A and green light source 48B may be inactive during the third time period 152 (e.g., red light source 48A and green light source 48B may not emit any illumination light during the third time period 152). Red light source 48A may be active during a subsequent fourth time period 152, green light source 48B may be active during a subsequent fifth time period 152, and blue light source 48C may be active during a subsequent sixth time period 152 (e.g., each light source may be active during two time periods 152 for a given image frame to be displayed by display module 14A).

In order to minimize power consumption by illumination optics 36, green light source 48B may be driven using lower current density than the green light source would have otherwise been driven under a different illumination sequence for a given field (e.g., while recovering similar visual performance). In order to recover the same overall brightness at green wavelengths as would otherwise be obtained if a higher current density were used to drive green light source 48B, light sources 48A-C may be driven using green-heavy illumination sequence 154 of FIG. 4.

Green-heavy illumination sequence 154 may include three time periods (slots) 156 that are used to produce illumination light 38 for a given image frame (e.g., a first time period 156-1, a subsequent second time period 156-2, and a subsequent third time period 156-3). Each time period 156 may correspond to an image subframe (field) that is displayed using fLCOS display panel 40. Both red light source 48A and green light source 48B may be active for first time period 156-1. During first time period 156-1, red light source 48A may emit red (R) illumination light 52A and green light source 48B may emit green (G) illumination light 52B. Prism 46 (FIG. 3) may combine illumination light 52A and 52B to produce illumination light 38. Blue light source 48C may be inactive during first time period 156-1.

Green light source 48B may be active for second time period 156-2. During second time period 156-2, green light source 48B may emit green illumination light 52B. Prism 46 (FIG. 3) may produce illumination light 38 based on the green illumination light 52B. Red light source 48A and blue light source 48C may be inactive during second time period 156-2.

Both blue light source 48C and green light source 48B may be active for third time period 156-3. During third time period 156-3, blue light source 48C may emit blue (B) illumination light 52C and green light source 48B may emit green illumination light 52B. Prism 46 (FIG. 3) may combine illumination light 52C and 52B to produce illumination light 38. Red light source 48A may be inactive during third time period 156-3.

In other words, green light source 48B may be active during each of the time periods 156 used to display a corresponding image frame (e.g., green light source 48B may contribute to the blue and red portions of the illumination sequence). By contributing green illumination light 52B to illumination light 38 in each time period 156 (e.g., by increasing the total on time for green light source 40B per image frame), the total illumination time for the green light source may be greater than in scenarios where RGBRGB illumination sequence 150 is used. This may allow green light source 48B to be driven with lower current density without significantly sacrificing optical performance, thereby minimizing power consumption in display module 14A.

The example of FIG. 4 is merely illustrative. If desired, other green-heavy illumination sequences having any desired number of periods 156 may be used (e.g., illumination sequences where green light source 48B is active during a greater number of time periods 156 per frame than red light source 48A and blue light source 48C). If desired, red light source 48A and/or blue light source 48C may be active during second time period 156-2 (e.g., where red light source 48A is driven using less current density than during time period 156-1 and where blue light source 48C is driven using less current density than during time period 156-3). Light sources 48A-C may emit illumination light of any respective colors, in general.

Figure 5:
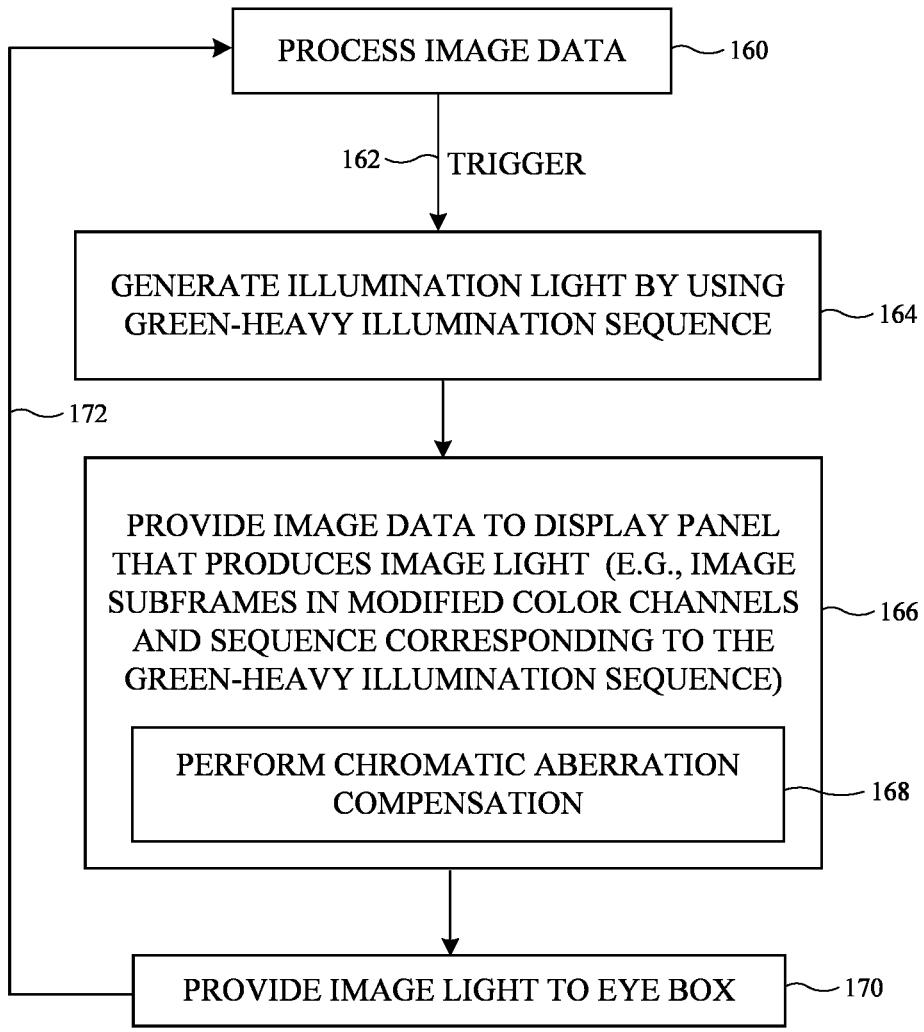
FIG. 5 is a flow chart of illustrative steps that may be involved in controlling an fLCOS display panel to display images based on a green-heavy illumination sequence in accordance with some embodiments.

FIG. 5 is a flow chart of illustrative steps that may be performed by system 10 to display images using a green-heavy illumination sequence such as green-heavy illumination sequence 154 of FIG. 4.

At step 160, control circuitry 16 (FIG. 2) may process image data to be displayed at eye box 24. The image data may include a stream of image frames. Control circuitry 16 may determine whether a trigger condition has been met before beginning to display images using the green-heavy illumination sequence.

If desired, control circuitry 16 may determine whether the trigger condition has been met based on the content of the image data to be displayed. For example, control circuitry 16 may determine that the trigger condition has been met when one or more image frames to be displayed exhibit a saturation level that exceeds a threshold saturation level (e.g., a green saturation level that exceeds a threshold green saturation level). If desired, the green-heavy illumination sequence may be disregarded in favor of another illumination sequence (e.g., RGBRGB illumination sequence 150 of FIG. 4) in scenarios where use of a green-heavy illumination sequence is unlikely to result in an improvement in power consumption and/or optical performance. This is merely illustrative and, in general, any desired trigger condition may be used (e.g., a command to begin using the green-heavy illumination sequence issued by a software call on system 10, a command to begin using the green-heavy illumination sequence as identified by user input provided to system 10, etc.). In some examples, the above trigger condition(s) may be used when the optical system is free of chromatic aberration. In one suitable arrangement that is sometimes described herein as an example (e.g., in scenarios where chromatic aberration is present), the trigger condition may be an ambient light level identified by ambient light sensor data collected by one or more ambient light sensors in system 10. If desired, different green light doping ratios may be used (e.g., in the green-heavy illumination sequence) based on the current measured ambient light level (e.g., control circuitry 16 may adjust the relative amount of green illumination in each of the time periods of the illumination sequence based on the ambient light sensor data such that different relative amounts are used when different ambient light levels are detected). This may help to ensure that chromatic aberration artifacts remain invisible to the eye, for example.

When the trigger condition has been met, processing may proceed to step 164, as shown by arrow 162. At step 164, control circuitry 16 may control light sources 48A-C to generate illumination light 38 using the green-heavy illumination sequence. Control circuitry 16 may, for example, provide driving signals to light sources 48A-C over control path(s) 42 (FIG. 2) (e.g., driving signals with a corresponding current density) that selectively activate light sources 48A-C in accordance with the green-heavy illumination sequence (e.g., green-heavy illumination sequence 154 of FIG. 4) for each image frame to be displayed. Control circuitry 16 may drive green light source 48B with lower current density than for display of the same image data using RGBRGB illumination sequence 150, minimizing power consumption in system 10 by meeting the peak efficiency of the green LED in green light source 48B.

If desired, step 166 may be performed concurrently with step 164. At step 166, control circuitry 16 may provide image data to fLCOS display panel 40 (FIG. 3). The image data may include image frame(s) (e.g., as processed at step 160). Each image frame may be used to control each pixel P* in fLCOS display panel 40 to modulate illumination light 38 (e.g., illumination light as generated in accordance with the green-heavy illumination scheme) to produce corresponding image light 22.

Each image frame may be divided into sub-frames or fields to be displayed during each time period 156 of the green-heavy illumination sequence (FIG. 4). For example, for a given image frame, a first sub-frame (field) of the image frame may be driven onto fLCOS display panel 40 during time period 156-1 of FIG. 4 (e.g., for producing a first sub-frame in image light 22 using the polarized red and green illumination light produced during time period 156-1), a second sub-frame (field) of the image frame may be driven onto fLCOS display panel 40 during time period 156-2 (e.g., for producing a second sub-frame in image light 22 using the polarized green illumination light produced during time period 156-2), and a third sub-frame (field) of the image frame may be driven onto fLCOS display panel 40 during time period 156-3 (e.g., for producing a third sub-frame in image light 22 using the polarized green and blue illumination light produced during time period 156-3). If desired, control circuitry 16 may perform chromatic aberration compensation operations when driving fLCOS display panel 40 with the image data (optional step 168).

At step 170, optical system 14B (FIG. 2) may direct the image light 22 produced by display module 14A towards eye box 24. Processing may subsequently loop back to step 160, as shown by arrow 172, as additional image frames are processed for display at the eye box. Control circuitry 16 may cycle through these steps rapidly enough so that each of the different-colored sub-frames appears at eye box 24 as a series of multi-color image frames to the user at eye box 24 (e.g., image frames having a corresponding color gamut and that appears visually similar to how the image frames appear to the user in scenarios where green light source 48B is driven with higher current density using an RGBRGB illumination sequence). In this way, power consumption in display module 14A may be minimized without significantly reducing image quality at eye box 24.

Figure 6:
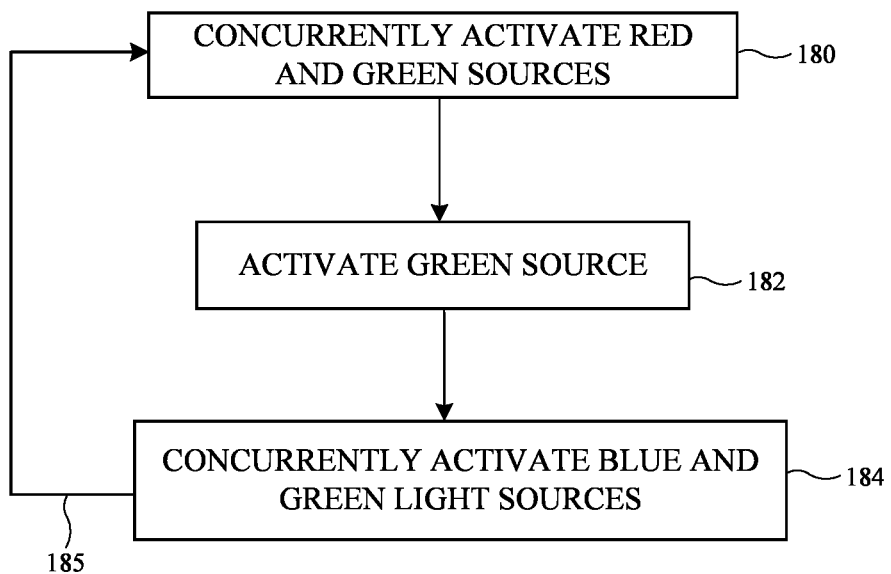
FIG. 6 is a flow chart of illustrative steps that may be involved in controlling light sources using a green-heavy illumination sequence in accordance with some embodiments.

FIG. 6 is a flow chart of illustrative steps that may be performed by control circuitry 16 in driving light sources 48A-C using the green-heavy illumination sequence (e.g., green-heavy illumination sequence 154 of FIG. 4). The steps of FIG. 6 may, for example, be performed while processing step 164 of FIG. 5 (e.g., for a given image frame to be displayed at the eye box).

At step 180 of FIG. 6, control circuitry 16 may concurrently activate (turn on) red light source 48A and green light source 48B to produce red illumination light 52A and green illumination light 52B (e.g., during time period 156-1 of FIG. 4). This may produce a corresponding sub-frame (field) of the image frame having a color given by the combination of red illumination light 52A and green illumination light 52B. Blue light source 48C may be inactive (turned off).

At step 182, control circuitry 16 may activate (turn on) green light source 48B to produce green illumination light 52B (e.g., during time period 156-2 of FIG. 4). This may produce a corresponding sub-frame (field) of the image frame having a green color given by green illumination light 52B. Red light source 48A and blue light source 48C may be inactive (turned off).

At step 184, control circuitry 16 may concurrently activate (turn on) blue light source 48C and green light source 48B to produce blue illumination light 52C and green illumination light 52B (e.g., during time period 156-3 of FIG. 4). This may produce a corresponding sub-frame (field) of the image frame having a color given by the combination of blue illumination light 52C and green illumination light 52B. Red light source 48A may be inactive (turned off). Processing may subsequently loop back to step 180, as shown by arrow 185, as additional image frames are displayed. The steps of FIG. 6 are merely illustrative and may, in general, be adapted to the particular green-heavy illumination sequence that is used to produce illumination light 38.

Figure 7:
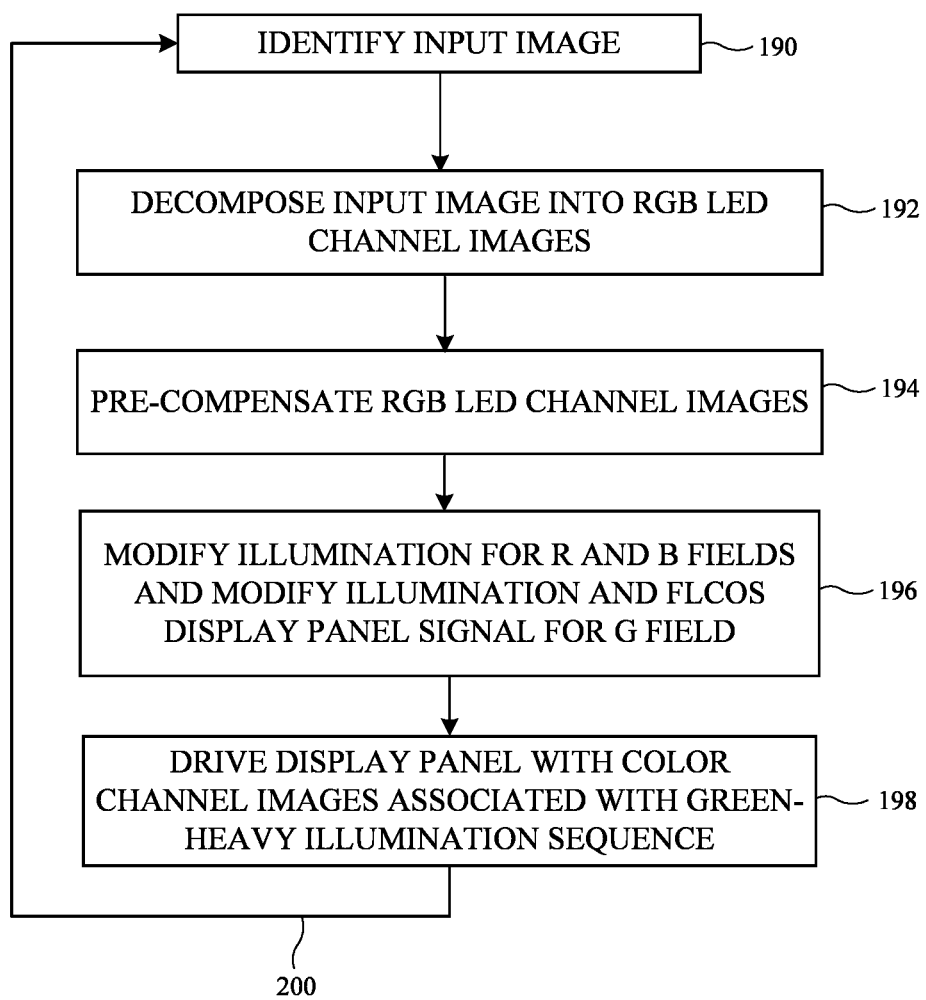
FIG. 7 is a flow chart of illustrative steps for driving an fLCOS display panel to compensate for chromatic aberrations in a display module in accordance with some embodiments.

FIG. 7 is a flow chart of illustrative steps that may be performed by control circuitry 16 in performing chromatic aberration compensation operations while driving fLCOS display panel 40 with the image data (e.g., while producing image light 22 using green-heavy illumination sequence 154 of FIG. 4). The steps of FIG. 7 may, for example, be performed while processing step 168 of FIG. 5 (e.g., for a given image frame to be displayed at the eye box). The steps of FIG. 7 may be performed to compensate for chromatic aberrations introduced into image light 22 by collimating lens 34 and/or any other desired optical components in display module 14A and/or optical system 14B (FIG. 2).

At step 190, control circuitry 16 may identify an image frame to be driven onto fLCOS display panel 40 for producing image light 22 in response to illumination light 38.

At step 192, control circuitry 16 may decompose the image frame into a red (R) LED channel image (sub-frame), a blue (B) LED channel image (sub-frame), and a green (G) LED channel image (sub-frame), for example.

At step 194, control circuitry 16 may pre-compensate the red, blue, and green LED channel images for chromatic aberration that will be introduced into image light 22 by the optical components of system 10 (e.g., control circuitry 16 may generate chromatic aberration pre-compensated red, blue, and green channel images). The amount of pre-compensation that needs to be introduced to each channel image to compensate for chromatic aberration may, for example, be determined during the design, manufacture, assembly, and/or testing of system 10 (e.g., in a manufacturing, testing, or calibration system). The pre-compensation may be performed, for example, by shifting the relative pixel position of portions of the image frame that will be subject to chromatic aberrations by different amounts across each of the color channels/fields.

At step 196, control circuitry 16 may perform green redistribution operations. For example, control circuitry 16 may first modify the red illumination light from light source 48A to a combination of red and green light from light sources 48A and 48B, without changing the corresponding image data used to drive fLCOS display panel 50 (sometimes referred to herein as the fLCOS display panel signal). Control circuitry 16 may then modify the blue illumination light from light source 48C to a combination of blue and green light from light sources 48B and 48C, without changing the corresponding fLCOS display panel signal. The red and blue illumination light may be modified to include 1-10% green illumination, between 2-8% green illumination, between 5-20% green illumination, around 5% green illumination, or any other desired amount of green illumination (sometimes referred to herein as the green light doping ratio). Control circuitry 16 may then modify the image data used to drive fLCOS display panel 50 for the green channel, by subtracting, from the image data for the green channel, image data corresponding to the amount of green illumination that was added into the red channel (e.g., in modifying the red illumination light as described above) and the amount of green illumination that was added into the blue channel (e.g., in modifying the blue illumination light as described above). Next, any negative signal values in the modified signal may be changed to zero (e.g., a black level) and excessive green illumination values (e.g., green illumination values that exceed a threshold value) may be changed to the maximum brightness of the field (e.g., as determined by the corresponding green light doping ratio).

At step 198, control circuitry 16 may drive fLCOS display panel 40 using color channel images (image data) associated with the green-heavy illumination sequence. For example, control circuitry 16 may drive fLCOS display panel 40 using an (R+G) channel image for the combination of red and green illumination light (e.g., during time period 156-1 of FIG. 4), then using a green (G) channel image as modified during step 196 (e.g., during time period 156-2 of FIG. 4), then using a (B+G) channel image for the combination of blue and green light (e.g., during time period 156-3 of FIG. 4). The corresponding image light 22 produced by fLCOS display panel 40 may be pre-compensated for chromatic aberrations by the optical components along the remainder of the optical path between display module 14A and eye box 24 (FIG. 2). After passing to eye box 24, the chromatic aberrations introduced by these optical components may cancel out the pre-compensation in the image light, thereby providing the eye box with images that are free from chromatic aberrations. Processing may subsequently loop back to step 190, as shown by arrow 200, as additional image frames are displayed.

In this way, power consumption may be minimized in display module 14A without significantly sacrificing image quality. The green-heavy illumination sequence need not be limited to fLCOS display systems and may, in general, be used to produce image light 22 in scenarios where display module 14A includes a DMD display panel, an emissive display panel, etc.

Figure 8:
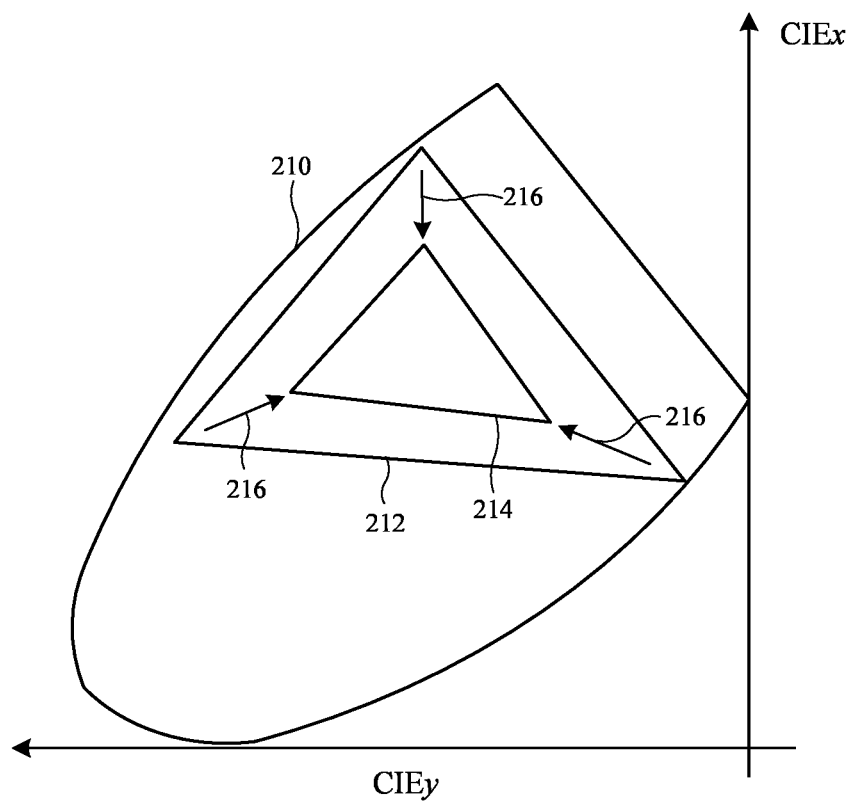
FIG. 8 is a CIE1931 color space plot that shows how illuminating an fLCOS panel using an illustrative green-heavy illumination sequence may modify the color gamut for images produced by the fLCOS panel in accordance with some embodiments.

Because green light source 48B is turned on more frequently under the green-heavy illumination sequence, the green-heavy illumination sequence may serve to shrink the overall color gamut of display module 14A. FIG. 8 is a CIE1931 color space plot showing how the green-heavy illumination sequence may serve to shrink the overall color gamut of display module 14A. As shown in FIG. 8, display module 14A may display images using a relatively large color gamut 212 (e.g., within overall color space 210) in scenarios where a green-heavy illumination sequence is not used to produce illumination light 38. The green-heavy illumination sequence may serve to reduce the color gamut of display module 14A to color gamut 214, as shown by arrows 216. Reducing the color gamut of display module 14A to color gamut 214 may serve to reduce the power consumption of display module 14A relative to scenarios where an RGBRGB illumination sequence is used, for example. The example of FIG. 8 is merely illustrative. In general, color space 210, color gamut 212, and color gamut 214 may have other shapes.

The foregoing is merely illustrative and various modifications can be made to the described embodiments. The foregoing embodiments may be implemented individually or in any combination.

What is claimed is:

1. An electronic device comprising:
   illumination optics that emit illumination of at least a first wavelength, a second wavelength, and a third wavelength;
   a spatial light modulator configured to produce light by modulating a series of image frames using the illumination, the illumination optics being configured to produce the illumination for each of the image frames in the series of image frames according to an illumination sequence, wherein the illumination sequence for each of the image frames in the series of image frames comprises a series of time periods and wherein the illumination includes the second wavelength during each of the time periods in the series of time periods;
   a waveguide configured to propagate the light; and
   an optical sensor configured to generate ambient light information, the illumination optics being further configured to adjust an amount of the second wavelength relative to the first and third wavelengths in the illumination based on the ambient light information.

2. The electronic device of claim 1, wherein the series of time periods comprises a first time period, a second time period subsequent to the first time period, and a third time period subsequent to the second time period, and wherein the illumination includes the second wavelength during each of the first, second, and third time periods.

3. The electronic device of claim 2, wherein the illumination includes the first wavelength during the first time period.

4. The electronic device of claim 3, wherein the illumination includes the third wavelength during the third time period.

5. The electronic device of claim 4, wherein the illumination does not include the third wavelength during the first time period and the illumination does not include the first wavelength during the third time period.

6. The electronic device of claim 5, wherein the illumination does not include the first and third wavelengths during the second time period.

7. The electronic device of claim 1, wherein the second wavelength is a green wavelength.

8. A method of operating an electronic device to display an image frame, the method comprising:
   with a first light source and a second light source of a different color than the first light source, emitting first illumination during a first time period;
   with a spatial light modulator, producing first light by modulating a first sub-frame of the image frame using the first illumination;
   pre-compensating the image frame for chromatic aberration prior to modulating the first illumination;
   with a waveguide, propagating the first light via total internal reflection;
   with the second light source, emitting second illumination during a second time period;
   with the spatial light modulator, producing second light by modulating a second sub-frame of the image frame using the second illumination, wherein pre-compensating the image frame comprises adding an amount of green illumination into the first and second illumination and subtracting, from the second sub-frame of the image frame, image data corresponding to the amount of green illumination; and
   with the waveguide, propagating the second light via total internal reflection.

9. The method of claim 8, further comprising:
   with the second light source and a third light source, emitting third illumination during a third time period;
   with the spatial light modulator, producing third light by modulating a third sub-frame of the image frame using the third illumination; and
   with the waveguide, propagating the third light via total internal reflection, wherein the second time period is subsequent to the first time period and wherein the third time period is subsequent to the second time period.

10. The method of claim 8, further comprising:
displaying the image frame in response to the image frame exhibiting a green saturation level that exceeds a threshold green saturation level.

11. The method of claim 8, further comprising:
with an ambient light sensor, gathering ambient light sensor data; and
adjusting an amount of green light in the first illumination based on the gathered ambient light sensor data.

12. The method of claim 8, wherein pre-compensating the image frame further comprises:
decomposing the image frame into a red light emitting diode (LED) channel image, a blue LED channel image, and a green LED channel image; and
pre-compensating the red LED channel image, the blue LED channel image, and the green LED channel image for chromatic aberrations.

13. The method of claim 12, wherein pre-compensating the image frame comprises:
after subtracting the image data corresponding to the amount of green illumination from the second sub-frame, replacing negative values in the second sub-frame with a black value and replacing values in the second sub-frame that exceed a threshold level with a value corresponding to a maximum brightness of the second illumination.

14. An electronic device comprising:
illumination optics having a first light source of a first color, a second light source of a second color that is different from the first color, and a third light source of a third color that is different from the first and second colors;
a spatial light modulator configured to produce light by modulating a series of image frames using illumination;
an optical sensor configured to generate ambient light data; and
one or more processors configured to control the illumination optics to produce the illumination for a given image frame in the series of image frames by:
activating the first and second light sources during a first time period,
activating the second light source during a second time period,
activating the second and third light sources during a third time period, and
adjusting an amount of the second light relative to the first and third lights in the illumination based on the ambient light data.

15. The electronic device of claim 14, wherein the second color comprises a wavelength between 500 nm and 565 nm.

16. The electronic device of claim 15, wherein the first color comprises red and the third color comprises blue.

17. The electronic device of claim 15, wherein the third light source is inactive during the first time period and the first light source is inactive during the third time period.

18. The electronic device of claim 14, further comprising:
a waveguide configured to propagate the light via total internal reflection, wherein the second time period is after the first time period and wherein the third time period is after the second time period.

* * * * *